March 11, 1952 — J. W. LEIGHTON — 2,589,009
ANTISWAY BAR
Filed March 22, 1946 — 2 SHEETS—SHEET 1
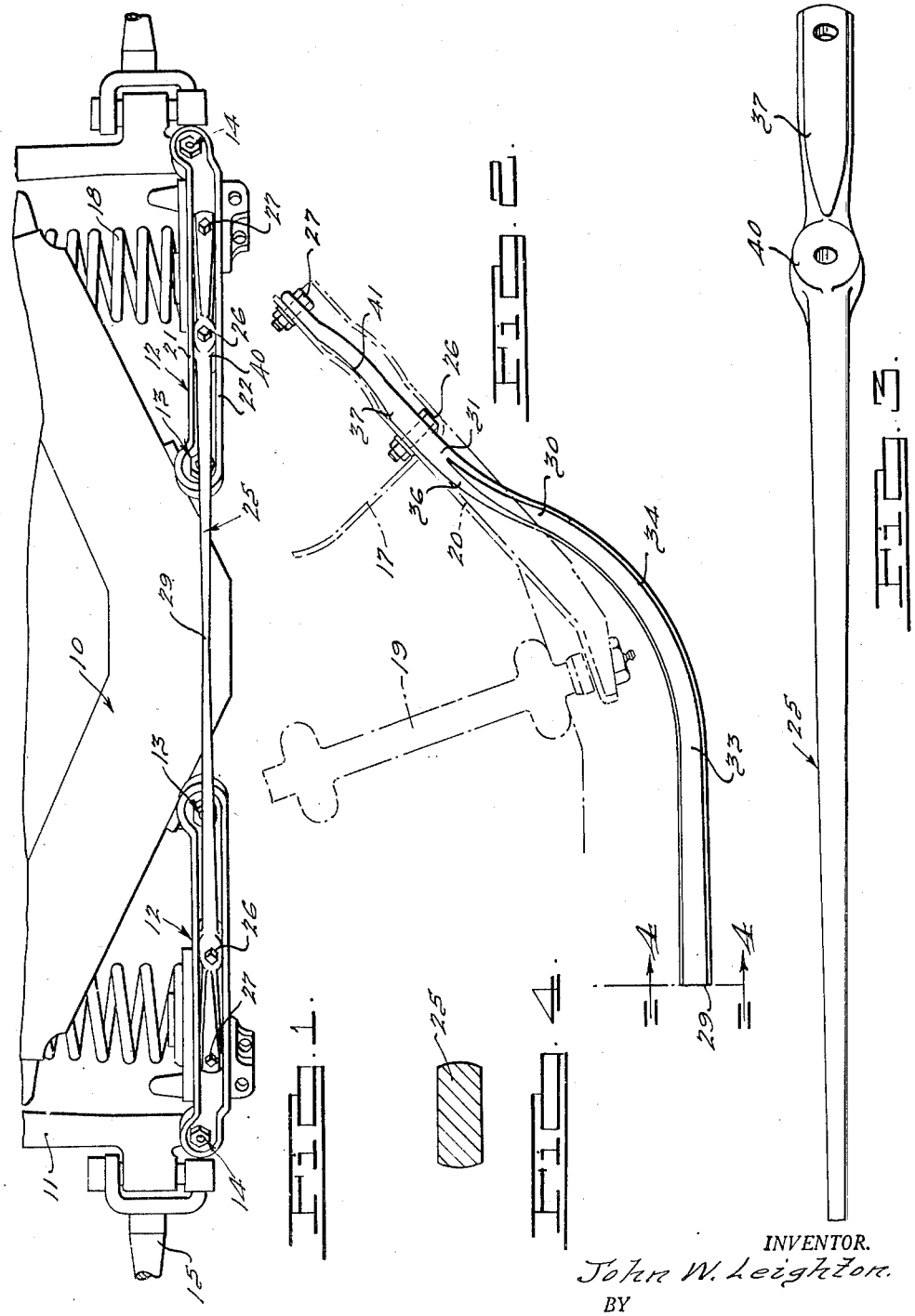
INVENTOR.
John W. Leighton.
BY Harness, Dickey & Pierce
ATTORNEYS.

March 11, 1952 — J. W. LEIGHTON — 2,589,009
ANTISWAY BAR
Filed March 22, 1946 — 2 SHEETS—SHEET 2
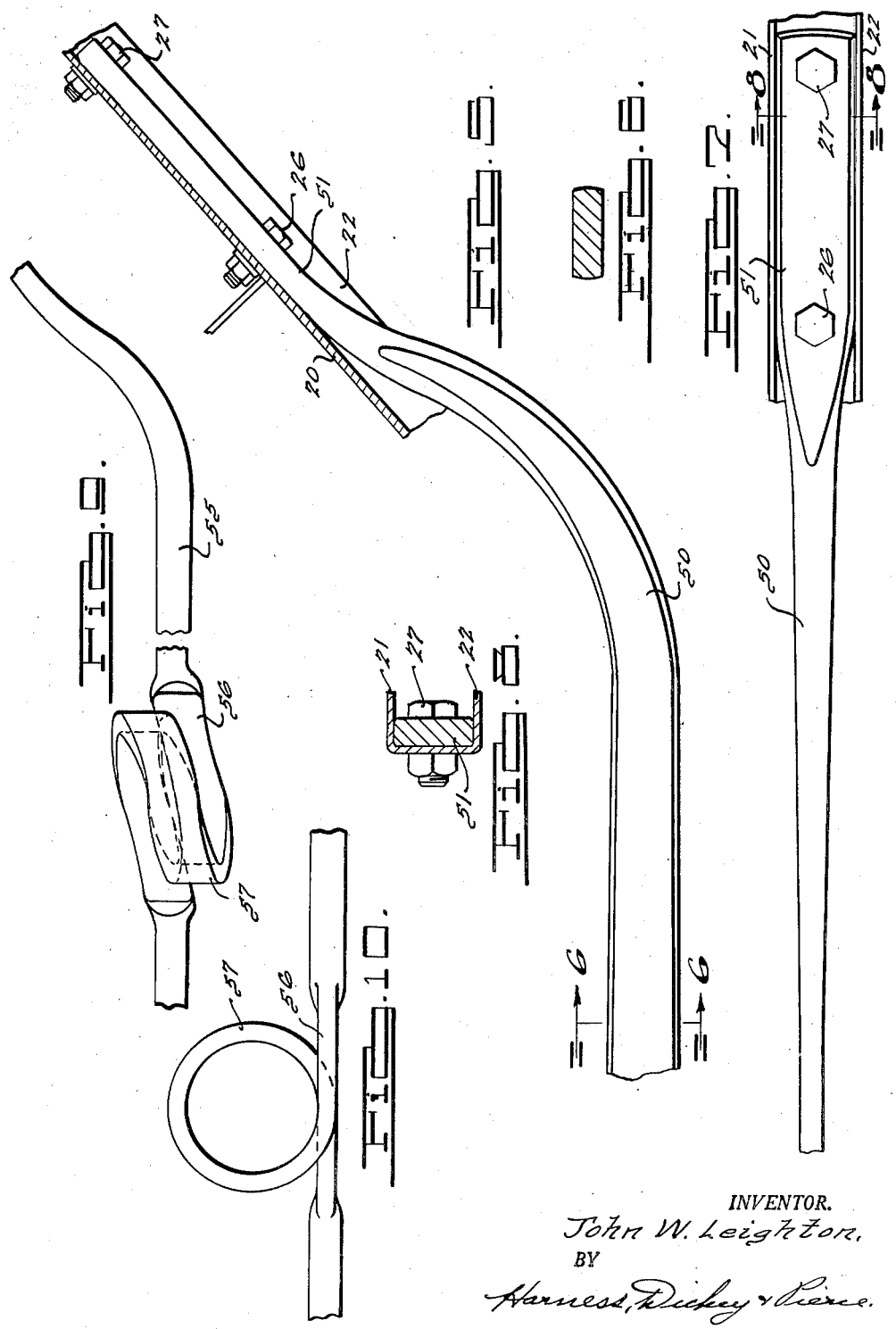
INVENTOR.
John W. Leighton,
BY
Harness, Dickey & Pierce.
ATTORNEYS.

Patented Mar. 11, 1952

2,589,009

UNITED STATES PATENT OFFICE 2,589,009

ANTISWAY BAR

John W. Leighton, Port Huron, Mich.

Application March 22, 1946, Serial No. 656,310

10 Claims. (Cl. 267—11)

The invention relates generally to automobiles and particularly to sway or roll controlling devices and their effect on the riding qualities of automobiles.

In certain respects the invention constitutes an improvement over those embodied in my copending applications for patent, Serial No. 566,869, filed December 6, 1944, now Patent No. 2,555,141, issued May 29, 1951, and Serial No. 598,122, filed June 7, 1945, now Patent No. 2,523,473, issued September 26, 1950.

As generally described in the aforesaid applications for patent, in connection with individual wheel suspensions as used at first, excellent riding qualities were obtained under usual road conditions because the coil springs were designed to secure such qualities. Later when anti-sway or anti-roll devices were added, usually in the form of transverse torsion bars mounted on the frame and connected to arms of the suspensions, a varying spring rate was added to the suspensions and the ride became rougher. More particularly in connection with the torsion type anti-sway bar, when the car is in motion on the road, the wheels operate independently of each other almost continuously except where a road is absolutely smooth. There are few, if any, such roads and hence for all practical purposes the wheels are constantly moving in opposite vertical directions. As a result, the torsion bar is constantly acting as a spring which is additional to the coil springs. If the bar is strong enough or has spring resistance enough to prevent lateral roll or sway, then since this strong spring resistance is added to the car springs when the car is in motion on the road, the ride becomes too harsh. If, on the other hand, the car springs are made soft enough to obtain a good ride with such a strong torsion bar, then in those instances when the wheels do move vertically together in the same direction the coil springs alone support the car and the spring support is too soft.

In using an anti-sway bar according to the inventions embodied in my copending applications for patent and in this application for patent, a similar condition is present as in the case of torsion bars excepting that the former add less spring resistance to the car springing at all times when the wheels move vertically in opposite directions or vertically in a relative sense. Moreover, this added spring resistance characterizing the inventions mentioned is substantially present when both wheels move vertically in the same direction. Therefore under the usual road conditions, the ride is softer and even where both wheels move together the bar adds some spring resistance to the coil springs so that the latter do not operate alone. On the other hand, if rolling or swaying of the frame tends to occur, the resistance of bars embodying the inventions becomes magnified greatly due to reverse bending in opposite directions. It follows that the use of bars involving the inventions enables obtaining a softer and less harsh ride while still providing strong resistance to rolling of the frame.

According to one form of the invention embodied in the present application for patent, the anti-sway bar is thinned towards its center or in other words its resistance to bending vertically increases from the center laterally towards the points where the ends of the bar are secured to the arms of the suspensions. This type of bar during any tendency of the frame to sway or roll laterally strongly and increasingly resists the rolling action because the two halves of the bar bend in opposite directions. The bar thus can be made to have greater resistance to bending towards the end portions connected to the arms so as to increase the resistance to roll or sway of the frame. At the same time the thinner sections of the bar will permit bending thereof such as must occur when the wheels move relative to the frame either independently or together, with a minimum increase in the total spring rate of the suspension. In other words, the invention obtains an increase in the sway resistance by strengthening the bar in the regions adjacent the connection with the suspension arms such as by increasing the bar sections in these regions while still permitting overall bending of the bar with vertical wheel movements with a lessened increase in the total spring rate. Also, the progressive thinning of the bar towards its center acts to distribute the stresses more uniformly along the bar.

One of the objects of the invention is to provide an improved type of bar which can be manufactured inexpensively and which performs its function efficiently for the purpose of preventing rolling and dipping of the frame while at the same time allowing a smooth ride to be obtained.

Another object of the invention is to provide an anti-sway bar which will increase the resistance to roll or sway while minimizing the increase in the total spring rate of the suspension during usual operating conditions.

Another object of the invention is to provide an improved anti-sway bar which has progressively increasing resistance to bending from its center and towards its ends so as to better distribute the stresses in accordance with the manner in which the bending of the bar occurs.

Another object of the invention is to provide a bar as last mentioned which has a larger diameter at desired locations so as to improve the action of the bar in preventing sway of the frame and which is thinned out at other locations so as to lower the spring rate of the bar under usual driving conditions.

Other objects of the invention will become apparent from the following specification, from the drawings relating thereto, and from the claims hereinafter set forth.

For a better understanding of the invention reference may be had to the drawings wherein:

Figure 1 is a front elevational view of a vehicle frame embodying opposing wheel suspensions connected by an anti-sway bar constructed according to one form of the present invention.

Fig. 2 is a fragmentary plan view showing the construction of the end portion of the bar shown in Figure 1.

Fig. 3 is a front view on a larger scale of the half section of bar shown in Figure 2.

Fig. 4 is a cross-sectional view on a larger scale taken sectionally along the line 4—4 of Figure 2.

Fig. 5 is a view similar to Figure 2 showing a bar constructed according to another form of the invention.

Fig. 6 is a cross-sectional view taken substantially along the line 6—6 of Figure 5.

Fig. 7 is a front elevational view of the construction shown by Figure 5 and;

Fig. 8 is a cross-sectional view taken substantially along the line 8—8 of Figure 7.

Fig. 9 is a plan view of a bar constructed according to another form of the invention and;

Fig. 10 is a front view of the bar shown by Fig. 9.

Referring to Figure 1, the frame of the vehicle is indicated at 10 and such frame may be of an ordinary type having side members extending longitudinally of the vehicle and having rear and front cross members. The portion of the frame shown in Fig. 1 may be considered generally as the front cross member of the frame.

Each of the individual wheel suspensions comprises an upper pivotal arm not shown, a vertically disposed wheel supporting member 11 hinged to the outer end of the upper arm and a lower arm 12. This lower arm is hinged to the frame as indicated at 13 and is also hinged to the lower end of the member 11 as indicated at 14. A wheel supporting axle 15 is mounted on the member 11 in a conventional manner.

Each of the lower arms 12 ordinarily may be in the form of a wish bone having a front leg which is the one shown and both legs of the wish bone support a coil spring seat or pan 17. The coil spring at each side of the frame is indicated at 18 and it abuts a portion of the frame at its upper end and rests on the pan 17 at its lower end. The hinge or pivot 13 comprises a control bar 19 fastened to the frame and the two legs of the wish bone respectively pivotly engage opposite ends of this bar. Each leg 12 is a stamping which is channel shape in cross-section and the vertical web of the channel is indicated at 20 while the upper and lower legs of the channel are indicated at 21 and 22 respectively. It is evident from the foregoing that when either wheel moves vertically with respect to the frame its arm 12 swings or pivots about the pivot 13 and the spring 18 compresses or elongates, depending upon the movement involved.

The anti-sway bar shown in Figure 1 is indicated at 25 and the two ends of this bar are disposed in the two channels at the opposite sides of the frame and are fastened to the webs 20 by bolts 26 and 27. The bar at each side of its center point, indicated at 29, is of the same shape and dimensions and it should be noted initially that it is thinnest at the center and progressively increases in thickness towards the bolts 26. This progressive increase in thickness is in a vertical direction and as the bar varies in thickness from its center its horizontal width increases. In other words, the bar is widest in a horizontal direction and thinnest in a vertical direction at the center 29 and progressively away from the center its horizontal width decreases while its vertical thickness increases. This variation continues, as seen in Figure 2, to a point 30 and beyond this point the vertical thickness increases and the shape of the bar gradually approaches a round condition at the point 31.

Also as seen in Figure 2, the bar extends in a substantially straight condition from the center to a point indicated at 33 and then it is curved as indicated at 34 to the point 30 and from this point it first is reversely curved as indicated at 36 and then it extends in a substantially straight condition as indicated at 37. The latter portion 37 is disposed in the channel and the two bolts 26 and 27 extend therethrough. Attention is directed to the fact that the bar is upset substantially in the region where the bolt 26 is applied and as indicated at 40 so has to increase the strength of the bar at this point and particularly to provide greater resistance to bending stresses. Provision of the upset portion 40 particularly is desirable where the bar is made from small diameter stock. Outwardly from the upset portion 40 the portion 37 is generally straight excepting that it is curved with the arm as indicated at 41 to clear the pan 17.

The bar described is made from round bar stock and the progressively thinned portions may be formed by suitable rolling operations. The upset portions 40 may be formed by suitable metal upsetting operations and the end portions 37 of the bar may be formed by suitable metal pressing operations.

The spring or resilient characteristics of the bar and its length and size must be such that the intermediate portion of the bar between the points of attachment to the arms 12 can bend as required in the operation of the automobile, including the double bending which resists frame roll or sway, without causing overstressing of the bar at any point or causing the elastic limit of any bending part of the bar to be reached. While the general manner in which the bar operates is brought out in the copending applications for patent mentioned, it may be observed in connection with the improved bar that it will bend easier at the center where greatest bending should occur and that its bending resistance will progressively increase towards the bolts as less bending should occur. Thus bending of the bar will be more uniform over the length of the bar between the bolts. During operation of the vehicle under usual road conditions where the wheels are moving vertically with respect to each other, the thinned central regions of the bar permit easier overall bending of the bar and consequently the increase in spring resistance added to the coil springs is minimized.

On the other hand, when the vehicle tends to roll or sway as when making a turn, bar must bend in a double manner or in other words, one bar at one side of the center bends in one direction while the other side bends in a reverse direction. When this condition occurs the increasing bar section towards each bolt 26 provides increasingly strong resistance to bending and a strong resistance to roll or sway is obtained. In either case, that is where bar resists roll by double bending or bends over its length between the bolts 26, the bending stresses are distributed more uniformly and the bar accordingly will be more durable without sacrificing any qualities desired.

In the construction shown by Figures 5 and 7, the bar indicated at 50 is substantially like that shown in the previous figures but in this case the bar is made from larger bar stock and instead of having the upset portion 40 as seen in Figure 3, the ends of the bar adjacent the bolts 26 are sufficiently large to provide the desired resistances to bending. In connection with Figure 7, it will be noted that the ends of the bar disposed in the channel are flattened to provide a section 51 which substantially fits between the legs 21 and 22 of the channel. In addition to the bolt fastening means, the ends of the bar are thus rigidly anchored through a snug fit between a substantial length of the bar and each channel and in effect, the end of the bar becomes a part of the channel structure.

Figs. 9 and 10 show a bar 55 made according to another form of the invention wherein the central portion of the bar is thinned in a vertical direction as indicated at 56 to provide less resistance to bending and such central portion is coiled to provide a spring convolution 57. At each side of the portion 56, the bar may be constructed to correspond to Fig. 3 or Fig. 7 or it might be desirable to use round bar stock between the portion 56 and the bolts and if needed to upset or strengthen the bar adjacent the bolts.

Although more than one form of the invention has been illustrated and described in detail, it will be apparent to those skilled in the art that various modifications may be made without departing from the scope of the claims.

What is claimed is:

1. An antisway device adapted to be connected to the arms of opposed wheel suspensions on opposite sides of a vehicle frame, comprising a bar having terminal coupling portions adapted to be respectively connected to such arms and a free intermediate portion between said coupling portions and which is resiliently bendable, said intermediate portion being substantially flat and relatively thin in one plane and the coupling portions being substantially flat and relatively thin in planes substantially perpendicular to the first plane.

2. An antisway device adapted to be connected to the arms of opposed wheel suspensions on a vehicle frame comprising a bar having rigid end coupling portions adapted to be respectively connected to such arms and a substantially straight intermediate portion located in a position between and substantially equidistant from said end coupling portions and which is resiliently bendable, said intermediate portion approximately from its own end regions to its center being progressively wider in one plane and progressively thinner in a plane normal to the first plane.

3. An antisway device adapted to be connected to the arms of opposed wheel suspensions on a vehicle frame comprising a bar having rigid end coupling portions adapted to be respectively connected to such arms and a substantially straight intermediate portion located in a position between and substantially equidistant from said end portions and which is resiliently bendable, the intermediate and end portions of the bar being relatively wide compared to the thickness but the wider area of the end portions being in planes normal to the plane of the wider areas of the intermediate portion.

4. In combination, a vehicle frame, an individual wheel suspension at each side of the frame and each including an arm connected to the frame and extending laterally therefrom for up and down swinging movement about an axis extending generally longitudinally of the frame, and a resilient bar extending laterally of the frame and having its end portions rigidly connected to the arms, said bar in the region of its longitudinal center being less resistant to bending forces than in regions adjacent to the central region.

5. In combination, a vehicle frame, an individual wheel suspension at each side of the frame and each including an arm connected to the frame and extending laterally therefrom for up and down swinging movement about an axis extending generally longitudinally of the frame, and a resilient bar extending laterally of the frame and having its end portions rigidly connected to the arms, said bar being thinnest in a vertical direction in the region of its longitudinal center.

6. In combination, a vehicle frame, an individual wheel suspension at each side of the frame and each including an arm connected to the frame and extending laterally therefrom for up and down swinging movement about an axis extending longitudinally of the frame, and a resilient bar extending laterally of the frame and having its end portions rigidly connected to the arms, said bar from its longitudinal central region and towards each end connected to the frame being progressively increased in resistance to bending in a vertical direction.

7. In combination, a vehicle frame, an individual wheel suspension at each side of the frame and each including an arm connected to the frame and extending laterally therefrom for up and down swinging movement about an axis extending longitudinally of the frame, and a resilient bar extending laterally of the frame and having its end portions rigidly connected to the arms, said bar from its longitudinal central region towards each end connected to the frame being progressively increased in thickness in a vertical direction.

8. An antisway device adapted to be connected to the arms of opposed wheel suspensions on a vehicle frame comprising a bar having terminal coupling portions adapted to be respectively connected to such arms and an intermediate portion between said end portions and which is resiliently bendable, said intermediate portion being modified substantially in its central region in its resistance to bending in one transverse direction to provide a resistance to bending in that plane which is less than the bending resistance of the end regions of the intermediate portion in the same direction, said coupling portions including holding portions extending in planes perpendicular to such plane of bending, said entire bar being bowed in said first-mentioned plane of bending so that both of said coupling portions lie on one side of said coupling portions.

9. An antisway device adapted to be connected to the arms of opposed wheel suspensions on a vehicle frame comprising a bar having terminal coupling portions adapted to be respectively connected to such arms and an intermediate portion between said end portions and which is resiliently bendable, said intermediate portion being modified in its resistance to bending in one transverse direction substantially in its central region to provide a resistance to bending in that plane which is less than the bending resistance of the end regions of the intermediate portion in the same direction, the intermediate portion of the bar being bodily offset in said same plane to one side only of said terminal coupling portions.

10. An antisway device adapted to be connected to the arms of opposed wheel suspensions on a vehicle frame comprising a bar having terminal coupling portions adapted to be respectively connected to such arms and an intermediate portion between said end portions and which is resiliently bendable, said intermediate portion being modified in its resistance to bending in one transverse direction substantially in its central region to provide a resistance to bending in that plane which is less than the bending resistance of the end regions of the intermediate portion in the same direction, the intermediate portion of the bar being bodily offset in said same plane to one side only of said terminal coupling portions and also being resiliently distortable to accommodate movement of said coupling portions toward and from one another.

JOHN W. LEIGHTON.

REFERENCES CITED

The following references are of record in the file of this patent:

UNITED STATES PATENTS

| Number | Name | Date |
| --- | --- | --- |
| 331,215 | Roth | Nov. 24, 1885 |
| 475,304 | Faske | May 24, 1892 |
| 509,069 | Burch | Nov. 21, 1893 |
| 1,130,157 | Elling | Mar. 2, 1915 |
| 1,377,980 | Cowey | May 10, 1921 |
| 1,742,387 | Gatter | Jan. 7, 1930 |
| 1,860,831 | Bell | May 31, 1932 |
| 2,254,261 | Best | Sept. 2, 1941 |
| 2,497,459 | Leighton | Feb. 14, 1950 |

FOREIGN PATENTS

| Number | Country | Date |
| --- | --- | --- |
| 113,345 | Great Britain | Feb. 21, 1918 |